July 20, 1954  K. RABE  2,683,996
STEERING WHEEL HAVING A HINGED RIM, PARTICULARLY
FOR MOTOR VEHICLES
Filed May 20, 1952
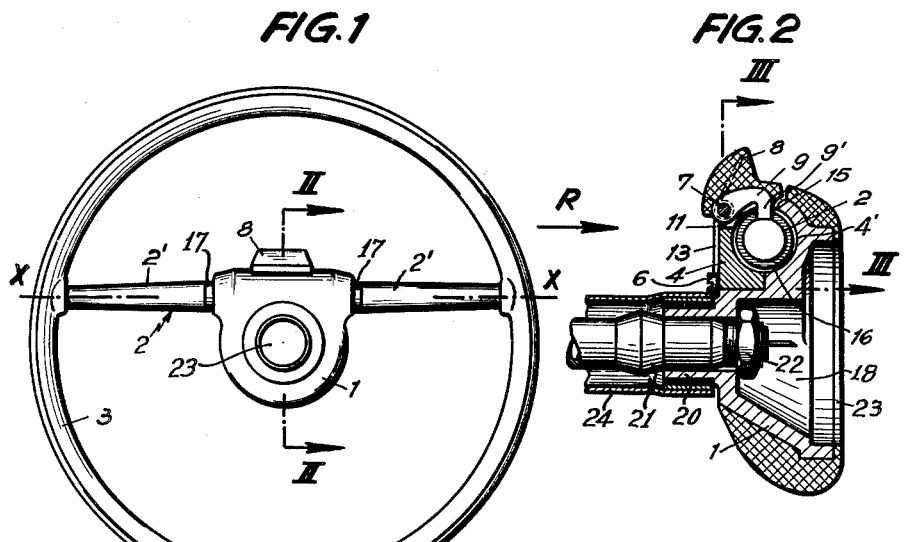
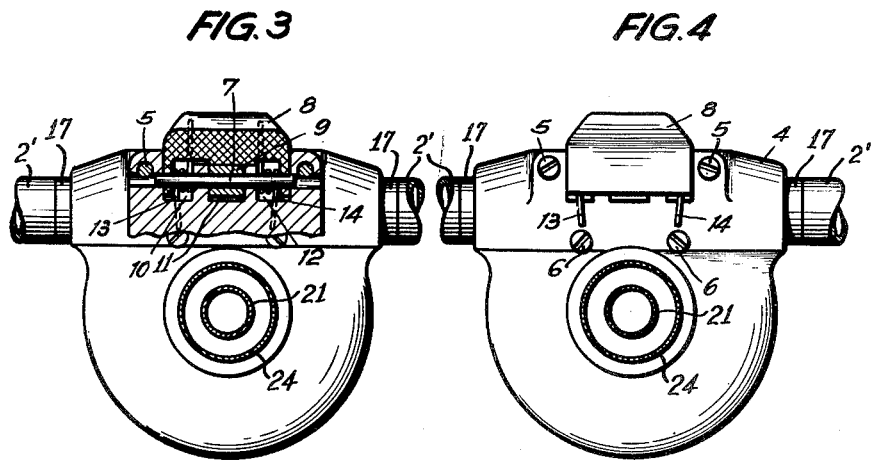
INVENTOR
Karl Rabe
BY
ATTORNEYS Patented July 20, 1954

2,683,996

UNITED STATES PATENT OFFICE 2,683,996

STEERING WHEEL HAVING A HINGED RIM, PARTICULARLY FOR MOTOR VEHICLES

Karl Rabe, Stuttgart, Germany, assignor to Dr. Ing. h. c. F. Porsche K.-G., Stuttgart-Zuffenhausen, Germany Application May 20, 1952, Serial No. 288,804

Claims priority, application Germany May 25, 1951

9 Claims. (Cl. 74—556)

This invention relates to improvements in steering wheels, particularly for motor vehicles, in which the rim of the steering wheel is hinged or pivoted on an axis lying in or substantially in the plane of the steering wheel.

It has been previously proposed to hinge the steering wheel of a motor vehicle, but so far as known such proposals have not been adopted, apparently because of the awkwardness of the hinging, the expense of the construction, or of the difficulties involved in providing a convenient simply-operable construction.

The primary object of the present invention is therefore to provide an improved steering wheel of simplified construction by which the rim of the steering wheel is pivoted or hinged with respect to the steering column, thereby providing additional space for the vehicle operator to get out of the vehicle or for carrying out some repair work or other adjustment of the vehicle in the vicinity of the steering wheel.

The further object of the invention is to provide an improved steering wheel for vehicles, the rim of which can be hinged with respect to the hub and steering column, and which can also be shifted bodily with respect to the steering column.

According to the invention, the improved steering wheel comprises a hub, a circular rim, a pair of spokes for the wheel having their outer ends fixed respectively to opposite portions of the rim, said spokes extending in axial alignment to each other along a chord of the rim at one side of its axis and the axis of the hub of the steering wheel, the inner ends of said spokes being mounted for axial rotation in the hub and a latch means for retaining said spokes in a non-rotatable position with respect to said hub.

In a preferred construction, the spokes comprise a single rod, bar, or tubular member extending through a tubular passageway in the steering wheel hub whereby the rim of the wheel may be shifted laterally with respect to the hub or pivoted with respect thereto, or shifted and pivoted with respect to the hub of the steering wheel. In this construction, the member forming the spokes of the wheel is preferably provided with a hole intermediate its ends, and the latch includes a spring biased pawl carried by the hub for engaging in said hole when the rim and spokes of the steering wheel are in their normal operating position.

The latch advantageously includes a pawl having a tapered or conical tooth, while a similar tapered hole is provided in the member forming the spokes, in order to provide a firm connection always free of any play between the spokes and the hub of the wheel. In this structure, the member forming the spokes advantageously includes a peripheral groove at the position of the hole therein and which opens into the hole, thereby providing a quick and ready engagement with the pawl when the steering wheel is shifted to its normal position. This groove or equivalent means may be provided for effecting ready centering of the rim with respect to the hub without causing the operator to hunt for the hole in the member forming the spokes when the rim of the wheel has been shifted laterally with respect to the hub.

The improved steering wheel construction of the present invention includes other features and advantages described more in detail hereinafter in connection with one illustrative embodiment as shown in the accompanying drawings.

In the drawings:

Fig. 1 is a plan view of a steering wheel constructed and arranged in accordance with the invention;

Fig. 2 is an enlarged broken sectional view of the hub and associated structure, taken on the line II—II of Fig. 1;

Fig. 3 is a broken sectional view looking from the left in Fig. 2, partly in vertical section, showing the interior structure of a trigger mechanism, the vertical section covering the extent of the line III—III in Fig. 2; and Fig. 4 is a broken elevational view of the hub structure shown in Fig. 2 looking in the direction of the arrow R.

Referring to Fig. 1 of the drawings, the improved steering wheel comprises a hub 1 mounted on a steering shaft in a steering column, a tubular member 2 forming spokes 2' and a circular rim 3 coaxial with the hub 1. The wheel includes only two spokes 2' which are aligned and arranged on a single axis X—X at a short distance from the steering axis of the hub 1. The axis X—X constitutes a chord of the rim 3 and the axis on which the rim of the steering wheel is hinged or pivoted. The two spokes 2' are preferably integral parts of a single tube or rod member, illustrated as the tube 2, which may be tapered slightly from the hub toward the rim of the steering wheel, the ends of the single member 2 being fixed in or to the rim 3, so that the rim 3 is non-rotatably mounted with respect to the member 2 and a rigid structure is provided.

The hub 1 of the steering wheel, as shown in Figs. 2, 3 and 4, has a bearing structure having a lateral passageway 4' through which the member 2 forming the spokes 2' extends, such passageway extending at right angles to the axis of the hub 1 and spaced somewhat therefrom, so that in a hinging operation the upper part of the wheel, as seen in Fig. 1, can be rotated into engagement with the steering column, the rim 3 then being in a plane approximately parallel to the steering column. The hub 1 includes a removable block portion 4 secured to the main body of the hub by means of screws 5 and 6, the lateral passageway 4' for receiving the member 2 being one half defined by the removable member 4 and the other half defined by the body of the hub 1, as shown in Fig. 2, thereby providing a convenient arrangement for assembling the rim and spoke structure to the hub.

The removable part or block 4 carries a trigger or latch mechanism for securing the rim assembly in its normal operating position, and as is shown in Fig. 3, the two screws 5, in addition to holding the upper part of the block 4 to the body of the hub 1, also secure in position a spindle 7 on which a handle or trigger 8 and a pawl or latch 9 are pivotally mounted. The screws 5 are at the respective ends of the spindle 7 and prevent its endwise movement. The trigger 8 and pawl 9 include portions through which the spindle 7 extends, such portions of the trigger 8 extending into the recesses 10 and 12, while the portion of the pawl 9 extends into the recess 11, of the part or block 4. As indicated in the drawings, the pawl 9 is made of metal secured in the trigger or handle 8, which may be made of plastic or other suitable material. These two parts may be assembled and secured together by casting the pawl 9 in the handle or trigger 8.

The elements 8 and 9 are biased toward locking position by the pressure of springs 13 and 14, one end of each of which extends into the body of the trigger 8. The coils of the springs extend around the spindle 7, respectively, in the recesses 10 and 12 and their other ends bear against the outside face of the block or part 4, as shown in Figs. 2 and 4 of the drawings. The springs 13 and 14 apply a pressure to the trigger 8 and pawl 9 urging them in a clockwise direction, as seen in Fig. 2 of the drawings.

The tube 2 forming the spokes of the steering wheel is provided intermediate its ends with a conical hole 15 which is engaged by the conically-shaped or tapered tooth 9' of the pawl 9 (Fig. 2). If the driver of the vehicle or a mechanic desires to pivot the rim of the steering wheel out of his way or displace it to one side or the other of the hub 1, he presses the trigger or handle 8 counterclockwise, as seen in Fig. 2, lifting the tooth 9' of the pawl 9 out of the hole 15 in the tube 2, thereby releasing the tube 2 and permitting rotation of the rim assembly about the axis X—X, or the shifting of the rim assembly until one side or the other of the rim engages the hub 1.

In order to facilitate re-engagement of the tooth 9' with the hole 15 in the tube 2, the tube is provided with a peripheral groove 16 at the position of the hole 15 and opening thereinto. If the rim assembly is merely pivoted with respect to the hub 1, the tooth 9' will be retained in the groove 16, so that all that is necessary is to pivot the rim of the wheel back to its normal position when the tooth 9' will snap into hole 15. If the rim assembly is displaced with respect to the hub by sliding the tube 2 axially in the passageway 4', it is readily returned to its normal position, since the tooth 9' will snap into the groove 16 regardless of the rotational position of the rim. Thereafter the operator merely pivots the rim assembly into its normal position with respect to the hub, when the tooth 9' will engage and snap into the hole 15.

Instead of providing the orienting and retaining groove 16, the tube 2 may be appropriately scored or marked as at 17, adjacent the sides of the hub 1 so that the operator can tell at a glance when the tube 2 is properly centered with respect to the hub 1, after which he can readily pivot the rim of the wheel until the tooth 9' snaps into the hole 15 in the tube.

In the steering wheel construction shown in the drawings, the hub of the steering wheel is illustrated as including an inner body structure 18, which may be made of metal, this being covered on the outside at least in part by a decorative covering 19 of plastic or other suitable material, which may have the outside shape shown in the drawings and be cast over the metal body 18. The metal body 18 includes a cylindrical portion 20 keyed to or pressed onto the end of a tubular steering shaft 21 and held in place by a nut 22. A front opening 23 provides access to the end of the shaft 21 and the nut 22, the tube 2 being located to one side of the inner portion of the opening where it does not interfere with the access to elements 21 and 22. Electrical wiring for the horn of the vehicle or for other electrical equipment may extend through the tubular shaft 21 and a suitable decorative button or other conventional cover, not shown, may be used to cover the opening 23 in the hub. The steering shaft 21 is surrounded by a conventional steering column 24.

The rim assembly, including the rim 3 and the cross bar 2, is a rigid steering structure in which the central portion of the bar 2 fits snugly in the hub bearing forming the passageway 4' where it is rigidly held in steering position by the pawl 9. Therefore, while the rim assembly may be pivoted and/or displaced out of the way, it provides a safe and effective steering means.

What is claimed as new is:

1. A steering wheel for motor vehicles comprising a rotatable hub, a steering rim normally mounted coaxial with the hub, the hub having a passageway at right angles to and to one side of its axis, a rod for supporting the rim constituting the spokes of the steering wheel, said rod having its ends fixed respectively to opposite portions of the rim and extending through the passageway in the hub, said rod being movable in said passageway whereby the rim of the wheel may be pivoted about the axis of the rod and displaced laterally in either direction with respect to the hub of the wheel by sliding the rod axially in the passageway in the hub, and latch means carried by the hub for engaging said rod and retaining the rim of the wheel in its normal position with respect to said hub.

2. A steering wheel as claimed in claim 1, in which the rod is tubular and is provided with a centrally located hole therein for engagement by the means for retaining the rim in its normal position with respect to the hub.

3. A steering wheel as claimed in claim 2, in which the means for engaging the rod comprises a spring-biased trigger pivoted on an axis parallel to that of the rod and carrying a pawl adapted to engage in the hole in the tubular rod.

4. A steering wheel as claimed in claim 3, in which the tubular rod is provided with a peripheral groove at the position of the hole therein, said groove opening into the hole and providing a means for engagement by the tooth of the pawl regardless of the pivoted position of the rim of the wheel with respect to the hub of the wheel when the rod and rim are shifted laterally to their normal center position.

5. A steering wheel for motor vehicles, comprising a rotatable hub, a rigid steering rim assembly consisting of a rim and a pair of spokes, said spokes being aligned with respect to each other, the outer ends of the spokes being fixedly attached respectively to opposite portions of the rim, said hub including a bearing structure having a passageway therethrough at right angles to the axis of the hub, the inner portions of said spokes extending into said passageway and being rotatably and slidably movable therein, whereby the rim assembly may be pivoted on the axis of the spokes and displaced laterally along the axis of the spokes in either direction with respect to the hub of the wheel, and a latch means carried by the hub for engaging said spokes and adapted to retain the rim in a fixed coaxial position with respect to the hub of the steering wheel.

6. A steering wheel as claimed in claim 5, in which the two spokes of the rim assembly comprise a single crossbar member.

7. A steering wheel as claimed in claim 5, in which the latch means is located at the top of the hub when the hub is in its normal position and includes a pivoted handle projecting above the hub, and means for biasing the latch means and its handle to a position for engaging the spokes and retaining the rim assembly in its normal position with the rim coaxial with the hub.

8. A steering wheel as claimed in claim 5, in which the two spokes comprise a single crossbar member provided with a hole normally located in the hub structure for cooperating with the latch means, said latch means including a tooth adapted to engage in said hole when the rim assembly is in its normal position with the rim coaxial with respect to the axis of the hub.

9. A steering wheel for motor vehicles, comprising a rotatable hub, a rigid steering rim assembly consisting of a rim and a crossbar for supporting the rim with respect to the hub of the steering wheel, the hub being provided with a passageway at right angles to its axis and through which said crossbar extends, the ends of the crossbar being fixed respectively to opposite portions of the rim to provide a rigid structure, said crossbar being rotatably and slidably movable in the passageway in the hub, whereby the rim assembly may be pivoted on the axis of the crossbar and displaced laterally in either direction along the axis of the crossbar relative to the hub of the wheel, and a latch means pivoted to the hub above said passageway on an axis parallel to the axis of the crossbar, said latch means including a spring-biased handle and a pawl engaging the crossbar for retaining the rim assembly in a fixed position with the rim arranged coaxial to the hub.

References Cited in the file of this patent

UNITED STATES PATENTS

| Number | Name | Date |
|---|---|---|
| 1,269,341 | Vincent | June 11, 1918 |
| 1,298,151 | Aiken | Mar. 25, 1919 |
| 1,403,660 | Weaver | Jan. 17, 1922 |
| 1,739,856 | Padgett | Dec. 17, 1929 |
| 2,133,010 | Barry | Oct. 11, 1938 |
| 2,139,546 | Hansen | Dec. 6, 1938 |
| 2,335,966 | Roos | Dec. 7, 1943 |
| 2,518,175 | Pinardi | Aug. 8, 1950 |